US011107199B2

(12) United States Patent
Guo et al.

(10) Patent No.: US 11,107,199 B2
(45) Date of Patent: Aug. 31, 2021

(54) AUTOMATIC CROSS-PLATFORM GEOMETRIC CORRECTION METHOD FOR MOON-BASED EARTH OBSERVATION IMAGE

(71) Applicant: Institute of Remote Sensing and Digital Earth, Chinese Academy of Sciences, Beijing (CN)

(72) Inventors: Huadong Guo, Beijing (CN); Lu Zhang, Beijing (CN); Guang Liu, Beijing (CN)

(73) Assignee: Institute of Remote Sensing and Digital Earth, Chinese Academy of Sciences, Beijing (CN)

( * ) Notice: Subject to any disclaimer, the term of this patent is extended or adjusted under 35 U.S.C. 154(b) by 46 days.

(21) Appl. No.: 16/395,780

(22) Filed: Apr. 26, 2019

(65) Prior Publication Data

US 2019/0251678 A1 Aug. 15, 2019

Related U.S. Application Data

(63) Continuation of application No. PCT/CN2018/088154, filed on May 24, 2018.

(30) Foreign Application Priority Data

Sep. 30, 2017 (CN) .......................... 201710944206.3
Oct. 19, 2017 (CN) .......................... 201710974189.8

(51) Int. Cl.
*G06K 9/40* (2006.01)
*G06T 5/00* (2006.01)
(Continued)

(52) U.S. Cl.
CPC ............ *G06T 5/006* (2013.01); *G06T 3/0068* (2013.01); *G06T 5/00* (2013.01); *G06T 5/50* (2013.01);
(Continued)

(58) Field of Classification Search
CPC .. G06T 5/006; G06T 5/00; G06T 5/50; G06T 3/0068; G06T 7/33; G06T 2207/30181; G06T 2207/10032
See application file for complete search history.

(56) References Cited

U.S. PATENT DOCUMENTS

2007/0292046 A1* 12/2007 Johnson .................. G06T 5/006
382/275
2009/0232349 A1* 9/2009 Moses ..................... G06T 5/006
382/100
2017/0250751 A1* 8/2017 Kargieman .......... G06K 9/0063

FOREIGN PATENT DOCUMENTS

CN 101050961 A 10/2007
CN 101738605 A 6/2010
(Continued)

OTHER PUBLICATIONS

Yuanzhen Ren et al., "Simulation of Moon-Based Observation for Large-Scale Earth Science Phenomena", pp. 6253-6256, IEEE 2016.*

(Continued)

*Primary Examiner* — Samir A Ahmed
(74) *Attorney, Agent, or Firm* — Thomas E. Lees, LLC (57) ABSTRACT

The disclosure analyzes moon-earth relationship and influencing factors for geometric distortion of a moon-based earth image, focuses on influences of position change of a sublunar point, a curvature of the earth, a terrain fluctuation on a large-scale hemisphere image, and the problem of small number of ground control points and uneven distribution thereof, and proposes a projection polar coordinate geometric expression method for the moon-based earth observation image, which takes into account of movement of the sublunar point, while considering multi-platform earth obser- (Continued)

vation data, to realize accurate automatic geometric correction of the moon-based platform earth observation data.

10 Claims, 5 Drawing Sheets

(51) Int. Cl.
    *G06T 5/50* (2006.01)
    *G06T 3/00* (2006.01)
    *G06T 7/33* (2017.01)

(52) U.S. Cl.
    CPC ...... *G06T 7/33* (2017.01); *G06T 2207/10032* (2013.01); *G06T 2207/30181* (2013.01)

(56) References Cited

FOREIGN PATENT DOCUMENTS

| | | |
|---|---|---|
| CN | 103487032 A | 1/2014 |
| CN | 105046251 A | 11/2015 |
| CN | 105427298 A | 3/2016 |
| CN | 106709944 A | 5/2017 |
| CN | 106845028 A | 6/2017 |
| CN | 106886977 A | 6/2017 |
| CN | 106920235 A | 7/2017 |
| CN | 106991656 A | 7/2017 |
| CN | 107024683 A | 8/2017 |
| CN | 107462220 A | 12/2017 |
| CN | 107657597 A | 2/2018 |
| EP | 2921991 A2 | 9/2015 |

OTHER PUBLICATIONS

Huadong Guo et al., "Moon-Based Earth Observation for Large Scale Geoscience Phenomena", pp. 3705-3707, IEEE 2016.*
Zhang, Lu et al. "A polar coordinate system based on a projection surface for moon-based earth observation images",dvances in Space Research 64 (2019) 2209-2220, ScienceDirect.*
Translation of the Written Opinion of the International Searching Authority for PCT Application No. PCT/CN2018/088154; State Intellectual Property Office of the P.R. China; Beijing, China; dated Aug. 8, 2018.
International Search Report for PCT Application No. PCT/CN2018/088154; State Intellectual Property Office of P.R. China; Beijing, China; dated Aug. 8, 2018.
Written Opinion of the International Searching Authority for PCT Application No. PCT/CN2018/088154; State Intellectual Property Office of the P.R. China; Beijing, China; dated Aug. 8, 2018.
Translation of the International Search Report for PCT Application No. PCT/CN2018/088154; State Intellectual Property Office of the P.R. China; Beijing, China; dated Aug. 8, 2018.
First Chinese Office Action for Chinese Patent Application No. 201710974189.8; Chinese Patent Office; dated Apr. 1, 2020.
First Chinese Office Action for Chinese Patent Application No. 201710944206.3, Chinese Patent Office; dated Jul. 18, 2019.

* cited by examiner

AUTOMATIC CROSS-PLATFORM GEOMETRIC CORRECTION METHOD FOR MOON-BASED EARTH OBSERVATION IMAGE

CROSS REFERENCE TO RELATED APPLICATIONS

This is a Continuation application of International Application Serial No. PCT/CN2018/088154, filed on May 24, 2018, which claims the benefit of Chinese Application No. 201710974189.8, filed on Oct. 19, 2017 and Chinese Application No. 201710944206.3, filed on Sep. 30, 2017, the disclosures of which are hereby incorporated by reference.

BACKGROUND

The disclosure relates to the field of earth observation, particularly relates to an automatic geometric correction method for a moon-based earth observation image, and more particularly to an automatic cross-platform geometric correction method for a moon-based earth observation image based on a polar coordinate system of the projection surface related to the sublunar point.

In order to realize a monitoring of macroscopic phenomena of the Earth on a global scale chronically and continuously, the research team led by Academician Huadong Guo proposed a new idea of moon-based platform earth observation. The Moon is the only natural satellite of the Earth. It has characteristics of integrity and stability in observing the Earth, and provides a more ideal observation platform for studying macroscopic scientific phenomena of the Earth. However, while the moon-based earth observation achieves instantaneous acquisition of hemisphere image, due to influences of factors such as an ultra-long distance of 384,000 kilometers, special geometric observation conditions, movement of sublunar point, and planet size, it is difficult to perform accurate geometric correction for observation data obtained by the moon-based platform, which manifests as a problem of geometrical variation of hemispherical-size image in different regions caused by curvature of the Earth, a problem of image center shift caused by sublunar point, a problem of change of observed area caused by movement of terminator line, and a problem of less number and uneven distribution of control points caused by large areas of oceans, clouds, etc., and the like.

Geometric correction is to map coordinates of a remote sensing image with coordinates of corresponding ground points. Conventional geometric correction methods are generally suitable for geometric correction for local small area, and often ignore influences of earth curvature on geometric distortion, which have limitations on geometric correction of remote sensing images obtained by the moon-based earth observation. Therefore, it is very necessary and important to develop a geometric correction method suitable for moon-based earth observation images.

BRIEF SUMMARY

Embodiments of the invention disclose an automatic cross-platform geometric correction method for a moon-based earth observation image, comprising the following steps: a moon-based platform earth observation geometric parameter acquisition step, in which moon-based earth observation geometric parameters at an observation time are determined based on the rule of movement among the sun, the earth and the moon; a space-borne remote sensing image projection polar coordinate expression step, in which a space-borne remote sensing image having been geocoded is expressed in a projection polar coordinate system form related to the sublunar point according to the moon-based earth observation geometric parameter; a moon-based earth observation image simulation step, in which the space-borne remote sensing image expressed in a projection polar coordinate system form is converted into a moon-based platform earth simulation image by an interpolation method according to a requirement for geometric accuracy of the moon-based earth observation image, so as to form a base map database for the moon-based platform earth simulation image; and a moon-based platform earth observation and simulation image registration step, in which an observation image obtained by the moon-based platform is matched with a base map of the moon-based platform earth simulation image in the base map database for the moon-based platform earth simulation image corresponding to the observation time to complete the geometric correction of the moon-based earth observation image.

According to the automatic cross-platform geometric correction method for the moon-based earth observation image in an embodiment, the moon-based earth observation geometric parameters include sublunar point information and terminator line information.

According to the automatic cross-platform geometric correction method for the moon-based earth observation image in an embodiment, the moon-based platform earth observation geometric parameter acquisition step comprises the following sub-steps: a sublunar point information acquisition sub-step, in which geographic coordinates (L0, B0) of the sublunar point at an observation time is determined according to the observation time (T0) and the relationship among the sun, the moon and the earth; and a terminator line information acquisition sub-step in which terminator line information at the observation time is determined according to the observation time and the relationship among the sun, the moon and the earth, so as to obtain an effective observation range of the moon-based platform and a range of day and night at that time.

According to the automatic cross-platform geometric correction method for the moon-based earth observation image in an embodiment, the space-borne remote sensing image projection polar coordinate expression step comprises the following sub-steps: a global elevation data acquisition substep, in which sensor data of a space-borne sensor of a type similar to a moon-based platform sensor are acquired, and the sensor data are registered to form a global geocoded image, so as to acquire global elevation data; a substep to acquire global elevation data of an observation area, in which the space-borne remote sensing image of an observation area and global elevation data of the same area are obtained based on the effective observation range for the observation time (T0) obtained by the moon-based platform earth observation geometric parameter acquisition step; a substep of polar coordinate expression based on sublunar point, in which the space-borne remote sensing image of the observation area is expressed in a projection polar coordinate system form related to the sublunar point.

According to the automatic cross-platform geometric correction method for the moon-based earth observation image in an embodiment, the substep of polar coordinate expression based on sublunar point comprises the following sub-steps: expressing geographical information of the space-borne remote sensing image in a geodetic coordinate system (L,B,H); converting the space-borne remote sensing image expressed in the geodetic coordinate system (L, B, H) into a spatial rectangular coordinate system (X, Y, Z); and converting the space-borne remote sensing image expressed in the spatial rectangular coordinate system (X, Y, Z) into an projection polar coordinate (ρ, θ) based on the sublunar point, and saving a (X, Y, Z-ρ, θ) mapping table of the image;

$$\rho = \frac{(X - X_0, Y - Y_0, Z - Z_0) \cdot (X_0, Y_0, Z_0)}{\sqrt{X_0^2 + Y_0^2 + Z_0^2}} \quad (4)$$

$$S: X \cdot X_0 + Y \cdot Y_0 + Z \cdot Z_0 = 0 \quad (5)$$

$$\theta = \cos^{-1} \frac{(X', Y', Z') \cdot (X'_n, Y'_n, Z'_n)}{\sqrt{(X'^2 + Y'^2 + Z'^2) \cdot (X_n'^2 + Y_n'^2 + Z_n'^2)}} \quad (6)$$

where $(X_0, Y_0, Z_0)$ are known coordinates of the sublunar point, (X,Y,Z) are coordinates of an arbitrary point on an ellipsoid, (X', Y', Z') are coordinates of (X,Y,Z) on a projection surface S, $(X'_n, Y'_n, Z'_n)$ are coordinates of the north pole point N on the projection surface S, and ρ is a polar axis in a polar coordinate system of the projection surface S, θ is an angle between (X, Y, Z) and $(X'_n, Y'_n, Z'_n)$ in the projection surface S.

According to the automatic cross-platform geometric correction method for the moon-based earth observation image in an embodiment, the moon-based earth observation image simulation step comprises the following sub-steps: processing the space-borne remote sensing image expressed in polar coordinates (ρ, θ) by interpolation based on the geometrical parameters of the moon-based platform earth observation image, to make it satisfy a homogeneous distribution of ρ and ρ·Δθ and a geometrical scale in conformity with the moon-based platform earth observation image, so as to obtain the moon-based platform earth simulation image with geometrical information $(\rho_s, \theta_s)$; determining (Xs,Ys,Zs) corresponding to the geometrical information $(\sigma_s, \theta_s)$ of the moon-based platform earth simulation image by using the (X,Y,Z-ρ, θ) mapping table based on the geometrical information $(\rho_s, \theta_s)$ of the moon-based platform earth simulation image; and storing the moon-based platform earth simulation image and corresponding $(\rho_s, \theta_s\text{-}Xs,Ys,Zs)$ mapping table into the base map database for the moon-based platform earth simulation image.

According to the automatic cross-platform geometric correction method for the moon-based earth observation image in an embodiment, the moon-based platform earth observation and simulation image registration step further comprises the following steps: extracting a corresponding base map of the moon-based platform earth simulation image and a $(\rho_s, \theta_s\text{-}Xs,Ys,Zs)$ mapping table from the base map database for the moon-based platform earth simulation image according to the observation time and the rule of periodical movement of the moon and the earth; selecting a registration method suitable for the type of the moon-based platform earth observation image, to register the moon-based platform earth observation image to the base map of the moon-based platform earth simulation image, thereby completing geometric correction of the moon-based platform earth observation image.

According to the automatic cross-platform geometric correction method for the moon-based earth observation image in an embodiment, the registration method is a scale-invariant feature transforming method.

According to the automatic cross-platform geometric correction method for the moon-based earth observation image in an embodiment, when a reference ellipsoid considering surface height of the earth is used as a reference earth model, a conversion relation relationship between the geodetic coordinate system (L, B, H) and the spatial rectangular coordinate system (X, Y, Z) is as follows:

$$X=(N+H)\cdot\cos B\cdot\cos L \quad (1)$$

$$Y=(N+H)\cdot\cos B\cdot\sin L \quad (2)$$

$$Z=[N\cdot(1-e^2)+H]\cdot\sin B \quad (3)$$

where H represents an altitude of an observed surface of the earth.

According to the automatic cross-platform geometric correction method for the moon-based earth observation image in an embodiment, in the substep of converting the space-borne remote sensing image expressed in the spatial rectangular coordinate system (X, Y, Z) into an orthographic projection polar coordinate (ρ, θ) based on the sublunar point, the orthographic projection polar coordinate system based on the sublunar point is defined as follows:

defining an origin O in the spatial coordinate system as a pole of the polar coordinate system;

defining the sublunar point o as an intersection of a line connecting a sensor placed on the moon and the center of the Earth and the surface of the Earth;

defining the projection surface S as a plane containing a line oO connecting the sublunar point and the center of the earth and crossing the origin of the spatial coordinate system;

taking a projection direction $\overrightarrow{OA}$ of a direction ON, in which the sublunar point pointing to the north pole N of the earth, projected on the plane S, as a 0 degree direction of the polar axis of the polar coordinate system;

for a point P on the ellipsoid, its arc length $\overset{\frown}{oP}$ is represented by l;

a length OP' from a projection point P' of the point P on the S plane to the pole O is represented by ρ, and ρ is a polar diameter of the point P, and an angle between OP' and OA is represented by θ, and θ is a polar angle of the point P.

The automatic cross-platform geometric correction method for the moon-based earth observation image of the embodiments of the invention utilizes projection polar coordinate expression based on the sublunar point, solving the problem of geometric distortion caused by periodic movement of the sublunar point, a curvature of the earth and an elevation fluctuation, and maintaining integrity and authenticity of information of the moon-based earth observation image. Meanwhile, the use of space-borne observation data solves the problems that the control points are difficult to acquire and inhomogeneous in distribution, realizing automatic geometric correction of the moon-based image without manual intervention.

DETAILED DESCRIPTION

To make the objects, the technical solutions and the advantages of the present invention more clear and apparent, the technical solutions in the embodiments of the present invention will be clearly and fully described in the following with reference to accompanying drawings in the embodiments of the present invention. It should be appreciated that the embodiments described herein are only intended to explain the invention rather than to limit the invention. The described embodiments are only a part of the embodiments of the invention, rather than all of the embodiments. All other embodiments obtained by those skilled in the art based on the embodiments of the present invention without creative efforts are within the scope of the present invention.

Figure 1:
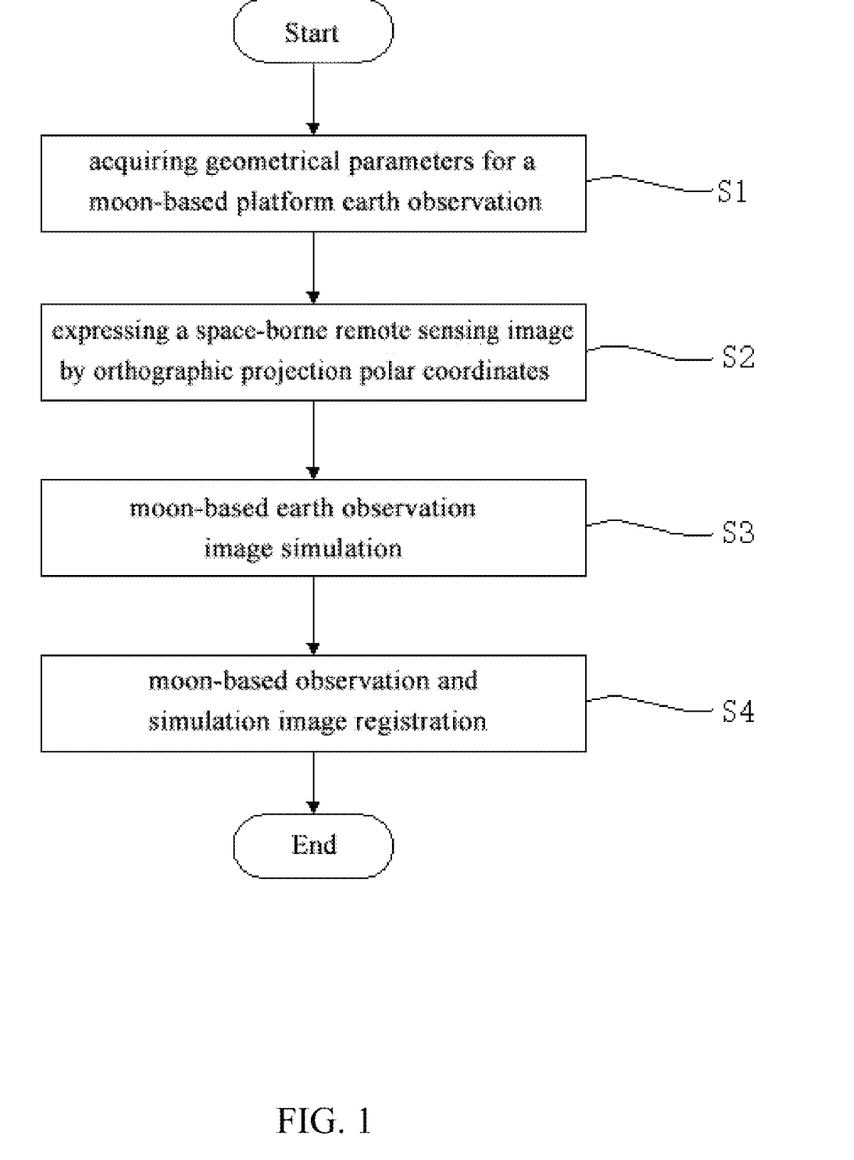
FIG. 1 is a flow chart of a method for automatic cross-platform geometric correction for a moon-based earth observation image according to an embodiment of the present invention.

FIG. 1 is a flow chart of a method for automatic cross-platform geometric correction for a moon-based earth observation image according to an embodiment of the present invention. As shown in FIG. 1, the method for automatic cross-platform geometric correction for a moon-based earth observation image comprises a moon-based platform earth observation geometric parameter acquisition step S1, a space-borne remote sensing image projection polar coordinate expression step S2, a moon-based earth observation image simulation step S3 and a moon-based platform earth observation and simulation image registration step S4. The respective steps will be specifically described below.

Figure 2:
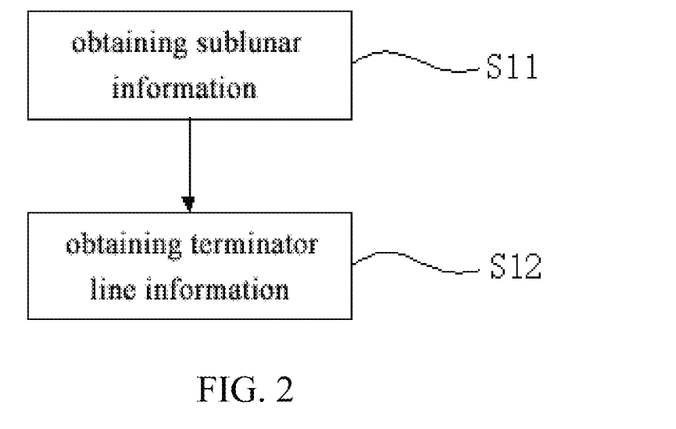
FIG. 2 is a flow chart of a moon-based platform earth observation geometric parameter acquisition step.

In the moon-based platform earth observation geometric parameter acquisition step S1, moon-based earth observation geometric parameters at an observation time are determined based on the rule of movement among the sun, the earth and the moon; for example, the moon-based earth observation geometric parameters include sublunar point information and terminator line information. Specifically, as shown in FIG. 2, the following substeps are included:

Substep S11: determining the sublunar point information, i.e., geographic coordinates (L0, B0) of the sublunar point, at the observation time according to an observation time (T0) and the relationship between the sun, the moon and the earth.

Substep S12: determining terminator line information at the observation time according to the observation time and the relationship among the sun, the moon and the earth, so as to obtain an effective observation range of the moon-based platform and a range of day and night at that time.

Figure 3:
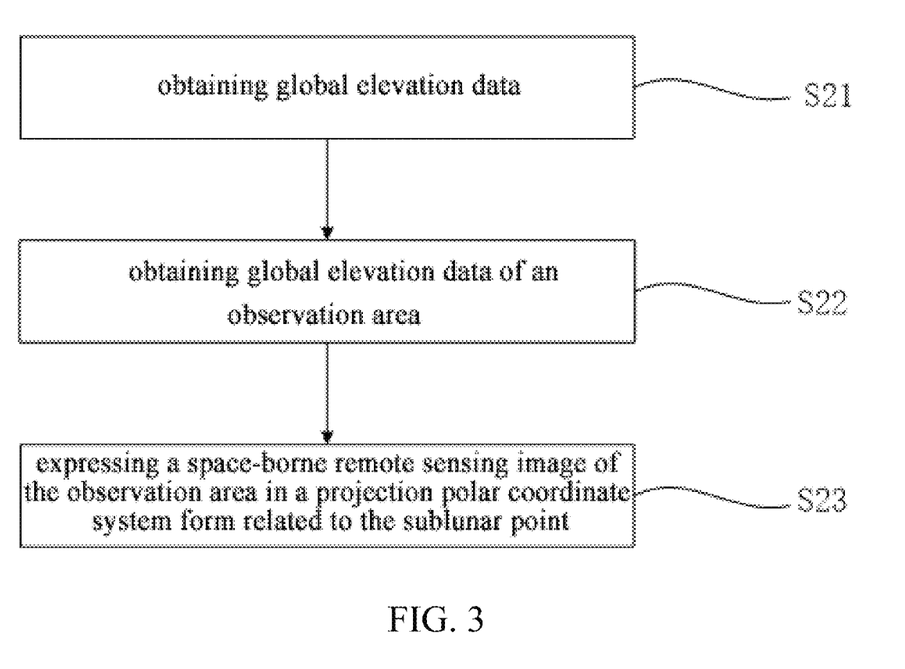
FIG. 3 is a flow chart of a space-borne remote sensing image projection polar coordinate expression step based on a sublunar point.

In the space-borne remote sensing image projection polar coordinate expression step S2, a space-borne remote sensing image having been geocoded is expressed in a projection polar coordinate system form related to the sublunar point according to the moon-based earth observation geometric parameters obtained in Step S1. Specifically, as shown in FIG. 3, the following sub-steps are included:

Substep S21: acquiring sensor data of a space-borne sensor of a type same or similar to a moon-based platform sensor, registering the sensor data to form a global geocoded image, thereby obtaining global elevation data (DEM).

Substep S22: obtaining the space-borne remote sensing image of an observation area and global elevation data (DMA) information of the same area based on the effective observation range for the observation time (T0) obtained by Step S1, expressing geographical information in a geodetic coordinate system (L, B,H).

Substep S23: expressing the space-borne remote sensing image of the observation area in a polar coordinate system form based on the sublunar point. Specifically, the space-borne remote sensing image expressed in the geodetic coordinate system (L, B, H) is converted into a spatial rectangular coordinate system (X, Y, Z). When a reference ellipsoid considering surface height of the earth is used as a reference earth model, a conversion relationship between the geodetic coordinate system (L, B, H) and the spatial rectangular coordinate system (X, Y, Z) is as follows:

$$X=(N+H)\cos B\cos L \quad (1)$$

$$Y=(N+H)\cos B\sin L \quad (2)$$

$$Z=[N\cdot(1-e^2)+H]\sin B \quad (3)$$

where H represents an altitude of an observed surface of the earth.

Then, the space-borne remote sensing image expressed in the spatial rectangular coordinate system (X, Y, Z) is converted into an orthographic projection polar coordinate ($\rho$, $\theta$) based on the sublunar point as the following formulas, and saving a (X,Y,Z-$\rho$,$\theta$) mapping table of the image.

Figure 4:
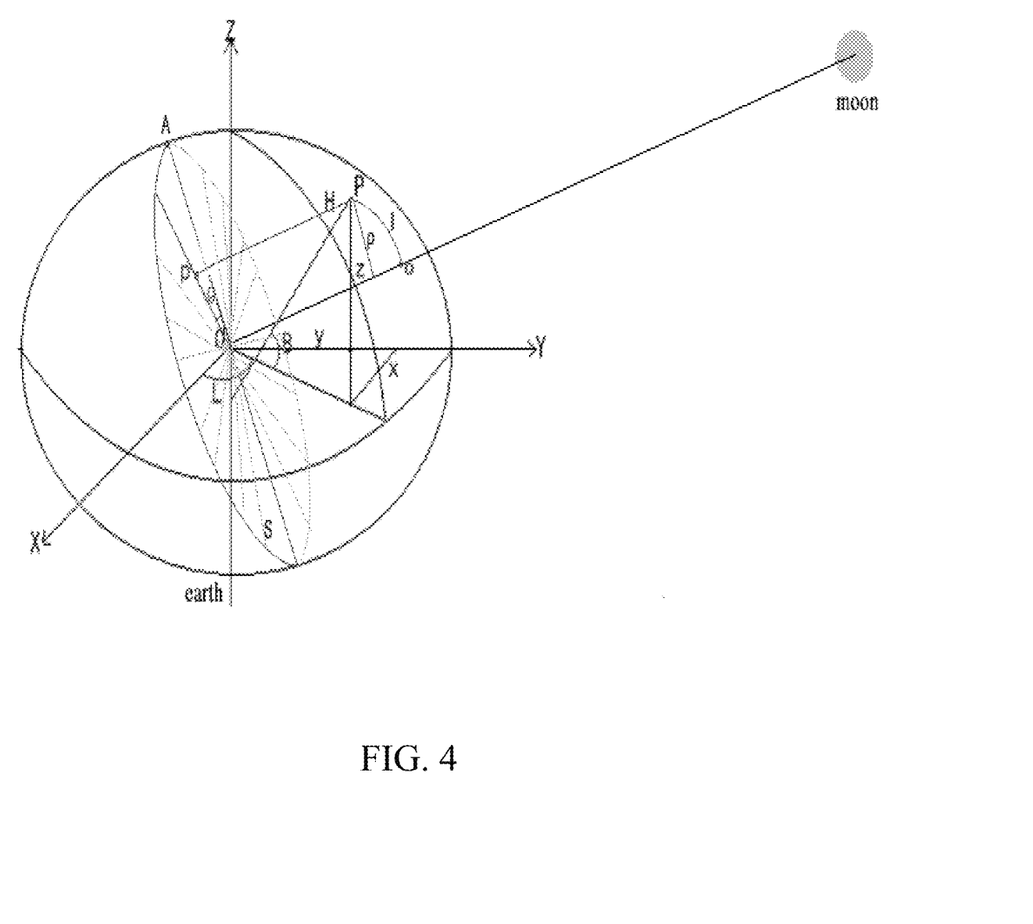
FIG. 4 is a schematic diagram showing projection polar coordinate expression based on the sublunar point.

Specifically, firstly, a polar coordinate system is defined, and an arbitrary point P on the surface of the earth is represented as ($\rho$, $\theta$). As shown in FIG. 4, the polar coordinate system for the moon-based earth observation remote sensing image is defined as below:

defining an origin O in the spatial coordinate system as a pole of the polar coordinate system;

defining the sublunar point o as an intersection of a line connecting a sensor placed on the moon and the center of the Earth, and the surface of the Earth;

defining the projection surface S as a plane containing a line oO connecting the sublunar point and the center of the earth and crossing the origin of the spatial coordinate system;

taking a projection direction $\overrightarrow{OA}$ of a direction ON, in which the sublunar point pointing to the north pole N of the earth, projected on the plane S, as a 0 degree direction of the polar axis of the polar coordinate system;

for a point P on the ellipsoid, its arc length $\overset{\frown}{oP}$ is represented by l;

a length OP' from a projection point P' of the point P on the S plane to the pole O is represented by $\rho$, and $\rho$ is a polar diameter of the point P, and an angle between OP' and OA is represented by $\theta$, and $\theta$ is a polar angle of the point P, where $0°\leq\theta<360°$.

Next, a conversion relationship between the projection polar coordinate system and the spatial rectangular coordinate system of the moon-based earth observation image is established. If an arbitrary point on the surface of the earth in a moon-based observation is expressed as (X, Y, Z) in a spatial rectangular coordinate system, this point is expressed in a projection polar coordinate system ($\rho$, $\theta$) as below:

$$\rho = \frac{(X - X_0, Y - Y_0, Z - Z_0)\cdot(X_0, Y_0, Z_0)}{\sqrt{X_0^2 + Y_0^2 + Z_0^2}} \quad (4)$$

$$S:\ X\cdot X_0 + Y\cdot Y_0 + Z\cdot Z_0 = 0 \quad (5)$$

$$\theta = \cos^{-1} \frac{(X', Y', Z') \cdot (X'_n, Y'_n, Z'_n)}{\sqrt{(X'^2 + Y'^2 + Z'^2) \cdot (X'^2_n + Y'^2_n + Z'^2_n)}} \quad (6)$$

where $(X_0, Y_0, Z_0)$ are known coordinates of the sublunar point, $(X,Y,Z)$ are coordinates of the arbitrary point on an ellipsoid, $(X', Y', Z')$ are coordinates of $(X,Y,Z)$ on a projection surface S, $(X'_n, Y'_n, Z'_n)$ are coordinates of the north pole point N on the projection surface S, and $\rho$ is a polar axis in a polar coordinate system of the projection surface S, $\theta$ is an angle between $(X, Y, Z)$ and $(X'_n, Y'_n, Z'_n)$ in the projection surface S. FIG. 4 shows a schematic diagram of projection polar coordinate expression based on the sublunar point.

Figure 5:
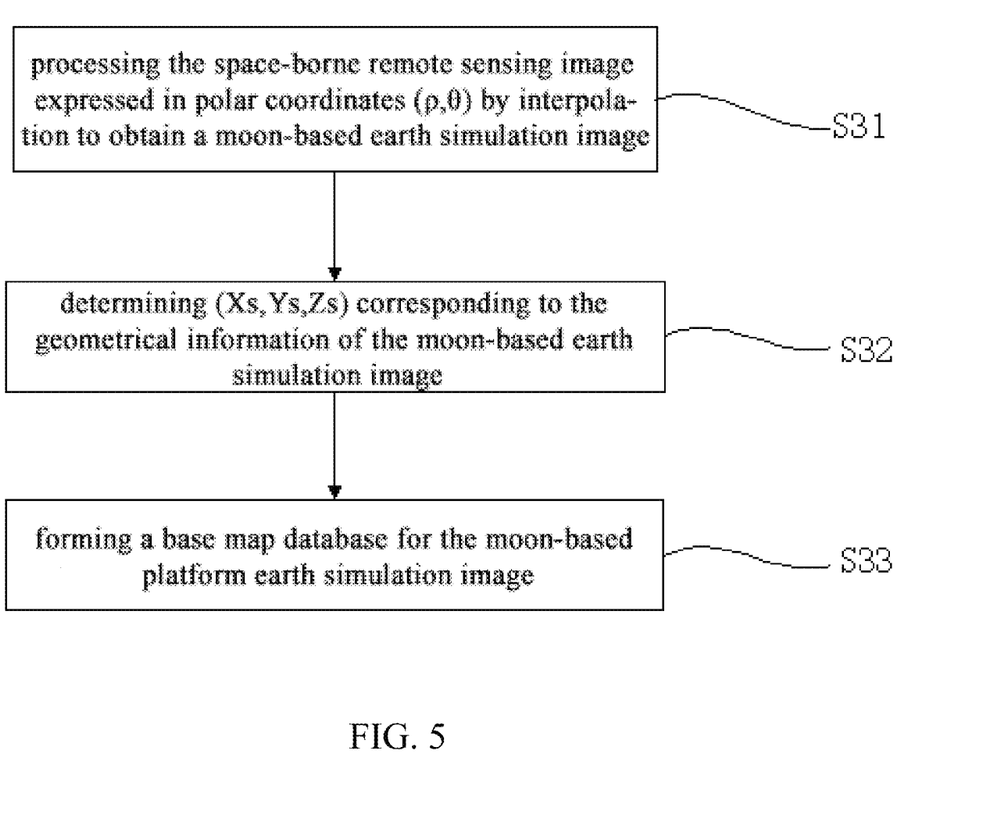
FIG. 5 is a flow chart of a moon-based earth observation image simulation step.

In the moon-based earth observation image simulation step S3, the space-borne remote sensing image expressed in a projection polar coordinate system form $(\rho, \theta)$ in Step S2 is converted into a moon-based platform earth simulation image by an interpolation method according to a requirement for geometric accuracy of the moon-based earth observation image, so as to form a base map database for the moon-based platform earth simulation image. Specifically, as shown in FIG. 5, the following sub-steps are included:

Substep S31: processing the space-borne remote sensing image expressed in polar coordinates $(\rho, \theta)$ in Step S2 by interpolation based on the geometrical parameters of the moon-based platform earth observation image, to satisfy a homogeneous distribution of $\rho$ and $\rho \cdot \Delta\theta$ and a geometrical scale in conformity with the moon-based platform earth observation image. After the interpolation, the moon-based platform earth simulation image with geometrical information $(\rho_s, \theta_s)$ is obtained.

Substep S32: determining (Xs, Ys, Zs) corresponding to the geometrical information $(\rho_s, \theta_s)$ by using the (X, Y, Z-$\rho$, $\theta$) mapping table obtained in Step S2, on basis of the geometrical information $(\rho_s, \theta_s)$ of the moon-based platform earth simulation image.

Substep S33: storing the moon-based platform earth simulation image and corresponding $(\rho_s, \theta_s$-Xs,Ys,Zs) mapping table to form a base map database for the moon-based platform earth simulation image. Due to periodicity of the movement between the moon and the earth, the stored information can be used periodically and repeatedly.

Figure 6:
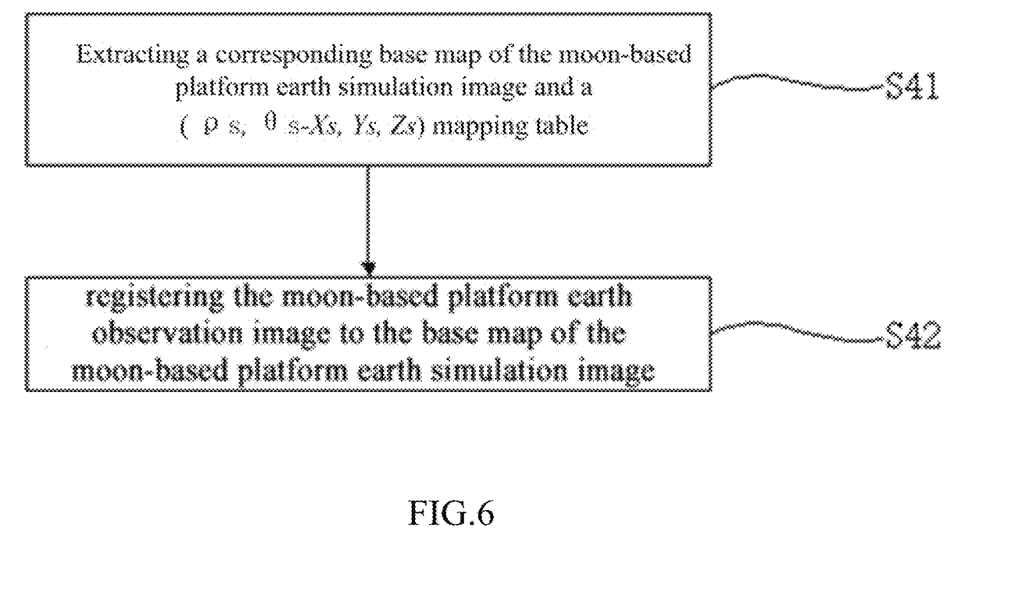
FIG. 6 is a flow chart of a moon-based platform earth observation and simulation image registration step.

In the moon-based platform earth observation and simulation image registration step S4, an observation image obtained by the moon-based platform is matched with the base map of the moon-based platform earth simulation image corresponding to the observation time, so as to complete the geometric correction of the moon-based earth observation image. According to an embodiment, as shown in FIG. 6, the following sub-steps are specifically included:

Substep S41: extracting a corresponding base map of the moon-based platform earth simulation image and a $(\rho_s, \theta_s$-Xs, Ys, Zs) mapping table from the base map database for the moon-based platform earth simulation image according to the observation time and the rule of periodical movement of the moon and the earth. If the information cannot be obtained in the base map database for the moon-based platform earth simulation image, going to steps S1, S2 and S3 to obtain the information.

Substep S42: selecting a registration method suitable for the type of the moon-based platform earth observation image, such as a scale-invariant feature transforming method, to register the moon-based platform earth observation image to the base map of the moon-based platform earth simulation image, thereby completing geometric correction of the moon-based platform earth observation image.

The automatic cross-platform geometric correction method for the moon-based earth observation image of the embodiments of the invention utilizes projection polar coordinate expressions based on the sublunar point, and introduces the proposed projection polar coordinate expression in a conversion relationship between a moon-based remote sensing image coordinates and geodetic coordinates as intermediate coordinates therebetween. The introduction of the projection polar coordinates has the following advantages: on the one hand, by expressing the moon-based remote sensing image with a projection polar coordinate, special distribution characteristics thereof are very close to the remote sensing image directly obtained by the moon-based earth observation. Therefore, when the moon-based remote sensing image is registered into projection polar coordinates, unified calibration model parameters can be established, improving accuracy and efficiency in registration, reducing influence of extreme unevenness of the moon-based earth image control points. Meanwhile, the polar coordinate expression can effectively reduce information lost or information redundancy during coordinate conversion of the moon-based earth image, achieving information fidelity of an earth observation hemisphere image, and can be used as a standard storage format with geometric information for the moon-based remote sensing image. On the other hand, a conversion model can be easily established between the projection polar coordinates and the geographical coordinates of the traditional remote sensing image, which can solve the problem of geometric distortion and other problems caused by movement of a sublunar point, a curvature of the earth, and a terrain fluctuation. Finally, requirements for geometric positioning accuracy for a high-resolution moon-based earth observation hemisphere image are satisfied.

Meanwhile, the use of space-borne observation data solves the problems that the control points are difficult to acquire and inhomogeneous in distribution, realizing automatic geometric correction of the moon-based earth image without manual intervention.

The above disclosure are only specific embodiments of the present invention, but the scope of the present invention is not limited thereto, and any change or substitution easily occurred to a person skilled in the art within the principle of the present invention should all be covered by the scope of the present invention.

What is claimed is:

1. An automatic cross-platform geometric correction method for a moon-based earth observation image, comprising:
    a moon-based platform earth observation geometric parameter acquisition step, in which moon-based earth observation geometric parameters at an observation time are determined based on the rule of movement among the sun, the earth and the moon;
    a space-borne remote sensing image projection polar coordinate expression step, in which a space-borne remote sensing image having been geocoded is expressed in a projection polar coordinate system form related to a sublunar point according to the moon-based earth observation geometric parameters;
    a moon-based earth observation image simulation step, in which the space-borne remote sensing image expressed in the projection polar coordinate system form is converted into a moon-based platform earth simulation image by an interpolation method according to a requirement for geometric accuracy of the moon-based earth observation image, so as to form a base map database for the moon-based platform earth simulation image; and a moon-based platform earth observation and simulation image registration step, in which an observation image obtained by a moon-based platform is matched with a base map of the moon-based platform earth simulation image in the base map database for the moon-based platform earth simulation image corresponding to the observation time to complete the geometric correction of the moon-based earth observation image.

2. The method according to claim 1, wherein the moon-based earth observation geometric parameters include sublunar point information and terminator line information.

3. The method according to claim 2, wherein the moon-based platform earth observation geometric parameter acquisition step comprises:

a sublunar point information acquisition sub-step, in which geographic coordinates (L0, B0) of the sublunar point at the observation time is determined according to the observation time T0 and the relationship among the sun, the moon and the earth; and a terminator line information acquisition sub-step, in which the terminator line information at the observation time is determined according to the observation time and the relationship among the sun, the moon and the earth, so as to obtain an effective observation range of the moon-based platform and a range of day and night at that time.

4. The method according to claim 3, wherein the space-borne remote sensing image projection polar coordinate expression step comprises:

a global elevation data acquisition substep, in which sensor data of a space-borne sensor of a type similar to a moon-based platform sensor are acquired, and the sensor data are registered to form a global geocoded image, so as to acquire global elevation data;

a substep to acquire global elevation data of an observation area, in which the space-borne remote sensing image of an observation area and global elevation data of the same area are obtained based on an effective observation range for the observation time obtained by the moon-based platform earth observation geometric parameter acquisition step; and a substep of polar coordinate expression based on the sublunar point, in which the space-borne remote sensing image of the observation area is expressed in a projection polar coordinate system form related to the sublunar point.

5. The method according to claim 4, wherein the substep of polar coordinate expression based on sublunar point comprises:

expressing geographical information of the space-borne remote sensing image in a geodetic coordinate system (L,B,H);

converting the space-borne remote sensing image expressed in the geodetic coordinate system (L,B,H) into a spatial rectangular coordinate system (X,Y,Z); and converting the space-borne remote sensing image expressed in the spatial rectangular coordinate system (X,Y,Z) into an orthographic projection polar coordinate expression ($\rho$, $\theta$) based on the sublunar point, and saving a (X,Y,Z-$\rho$, $\theta$) mapping table of the image;

$$\rho = \frac{(X - X_0, Y - Y_0, Z - Z_0) \cdot (X_0, Y_0, Z_0)}{\sqrt{X_0^2 + Y_0^2 + Z_0^2}} \quad (4)$$

$$S: X \cdot X_0 + Y \cdot Y_0 + Z \cdot Z_0 = 0 \quad (5)$$

$$\theta = \cos^{-1} \frac{(X', Y', Z') \cdot (X'_n, Y'_n, Z'_n)}{\sqrt{(X'^2 + Y'^2 + Z'^2) \cdot (X'^2_n + Y'^2_n + Z'^2_n)}} \quad (6)$$

where $(X_0, Y_0, Z_0)$ are known coordinates of the sublunar point, $(X, Y, Z)$ are coordinates of an arbitrary point on an ellipsoid, $(X', Y', Z')$ are coordinates of $(X, Y, Z)$ on a projection surface S, $(X'_n, Y'_n, Z'_n)$ are coordinates of the north pole point N on the projection surface S, and $\rho$ is a polar axis in a polar coordinate system of the projection surface S, $\theta$ is an angle between $(X, Y, Z)$ and $(X'_n, Y'_n, Z'_n)$ in the projection surface S.

6. The method according to claim 5, wherein when a reference ellipsoid considering surface height of the earth is used as a reference earth model, a conversion relationship between the geodetic coordinate system (L, B, H) and the spatial rectangular coordinate system (X, Y, Z) is as follows:

$X=(N+H)\cdot\cos B\cdot\cos L$ $Y=(N+H)\cdot\cos B\cdot\sin L$ $Z=[N\cdot(1-e^2)+H]\cdot\sin B$ where H represents an altitude of an observed surface of the earth.

7. The method according to claim 5, wherein in the step of converting the space-borne remote sensing image expressed in the spatial rectangular coordinate system (X, Y, Z) into an orthographic projection polar coordinate expression ($\rho$, $\theta$) based on the sublunar point, the orthographic projection polar coordinate system based on the sublunar point is defined as follows:

defining an origin O in the spatial coordinate system as a pole of the polar coordinate system;

defining the sublunar point o as an intersection of a line connecting a sensor placed on the moon and the center of the earth, and the surface of the Earth;

defining the projection surface S as a plane containing a line oO connecting the sublunar point and the center of the earth and crossing the origin of the spatial coordinate system;

taking a projection direction $\overrightarrow{OA}$ of a direction ON, in which the sublunar point pointing to the north pole N of the earth, projected on the plane S, as a 0 degree direction of the polar axis of the polar coordinate system;

for a point P on the ellipsoid, its arc length $\widehat{oP}$ is represented by 1;

a length OP' from a projection point P' of the point P on the S plane to the pole O is represented by $\rho$, and $\rho$ is a polar diameter of the point P, and an angle between OP' and OA is represented by $\theta$, and $\theta$ is a polar angle of the point P.

8. The method according to claim 4, wherein the moon-based earth observation image simulation step comprises:

processing the space-borne remote sensing image expressed in polar coordinates ($\rho$, $\theta$) by interpolation based on the geometrical parameters of the moon-based platform earth observation image, to make it satisfy a homogeneous distribution of $\rho$ and $\rho\cdot\Delta\theta$ and a geometrical scale in conformity with the moon-based platform earth observation image, so as to obtain the moon-based platform earth simulation image with geometrical information ($\rho_s$, $\theta_s$) after the interpolation;

determining (Xs, Ys, Zs) corresponding to the geometrical information ($\rho_s$, $\theta_s$) of the moon-based platform earth simulation image by using the LX, Y, Z-$\rho$, $\theta$) mapping table based on the geometrical information ($\rho_s$, $\theta_s$) of the moon-based platform earth simulation image; and storing the moon-based platform earth simulation image and a corresponding ($\rho_s$, $\theta_s$-Xs, Ys, Zs) mapping table into the base map database for the moon-based platform earth simulation image.

9. The method according to claim 8, wherein the moon-based platform earth observation and simulation image registration step comprises:

extracting a corresponding base map of the moon-based platform earth simulation image and a ($\rho_s$, $\theta_s$-Xs,Ys, Zs) mapping table from the base map database for the moon-based platform earth simulation image according to the observation time and the rule of periodical movement of the moon and the earth;

selecting a registration method suitable for the type of the moon-based platform earth observation image, to register the moon-based platform earth observation image to the base map of the moon-based platform earth simulation image, thereby completing geometric correction of the moon-based platform earth observation image.

10. The method according to claim 9, wherein the registration method is a scale-invariant feature transforming method.

* * * * *

UNITED STATES PATENT AND TRADEMARK OFFICE
CERTIFICATE OF CORRECTION

PATENT NO. : 11,107,199 B2
APPLICATION NO. : 16/395780
DATED : August 31, 2021
INVENTOR(S) : Guo et al.

Page 1 of 1

It is certified that error appears in the above-identified patent and that said Letters Patent is hereby corrected as shown below:

In the Claims

Column 11, Line 7, Claim 8:
"by using the LX, Y, Z-$\rho$, $\theta$)" should read --by using the (X, Y, Z-$\rho$, $\theta$)--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*